(12) United States Patent
Stavig, Jr. et al.

(10) Patent No.: US 10,035,196 B2
(45) Date of Patent: Jul. 31, 2018

(54) FAILSAFE LOCATING DEVICE FOR DRILLING HOLES

(71) Applicant: THE BOEING COMPANY, Chicago, IL (US)

(72) Inventors: Paul Nelsen Stavig, Jr., Puyallup, WA (US); Avery C. Alby, Renton, WA (US)

(73) Assignee: THE BOEING COMPANY, Chicago, IL (US)

( * ) Notice: Subject to any disclaimer, the term of this patent is extended or adjusted under 35 U.S.C. 154(b) by 380 days.

(21) Appl. No.: 14/716,551

(22) Filed: May 19, 2015

(65) Prior Publication Data

US 2016/0339529 A1 Nov. 24, 2016

(51) Int. Cl.
| | |
|---|---|
| *B23Q 17/22* | (2006.01) |
| *B23B 45/04* | (2006.01) |
| *B23B 35/00* | (2006.01) |
| *B64F 5/10* | (2017.01) |

(52) U.S. Cl.
CPC .............. *B23B 45/04* (2013.01); *B23B 35/00* (2013.01); *B23B 2215/04* (2013.01); *B23B 2270/027* (2013.01); *B23B 2270/12* (2013.01); *B23B 2270/34* (2013.01); *B64F 5/10* (2017.01)

(58) Field of Classification Search
CPC ... B23B 315/00; B23B 45/04; B23B 2215/04; B23B 2270/027; B23B 2270/12; B23B 2270/34; B64F 5/10; B25H 1/0035; B23Q 9/0007; B23Q 9/02; B23Q 15/14; B23Q 15/22; B23Q 17/22; B23Q 17/2233
See application file for complete search history.

(56) References Cited

U.S. PATENT DOCUMENTS

| | | | | |
|---|---|---|---|---|
| 3,572,181 | A | * | 3/1971 | Schlegel ................. B23B 49/00 340/680 |
| 3,636,814 | A | * | 1/1972 | Esch ...................... B23Q 17/22 33/201 |
| 4,601,618 | A | | 7/1986 | McEldowney |
| 7,374,373 | B1 | * | 5/2008 | Park ...................... B23B 39/003 408/12 |

* cited by examiner

*Primary Examiner* — Daniel Howell
*Assistant Examiner* — Paul M Janeski
(74) *Attorney, Agent, or Firm* — Patterson + Sheridan, LLP (57) ABSTRACT

The present disclosure generally relates to a drilling tool having one or more locating brackets. The locating brackets include contacts that when engaged by a workpiece or a component adjacent to a workpiece, complete a pneumatic circuits of a pneumatic switch. Completion of the pneumatic circuits facilities operation of a drill of the drilling tool, thus allowing operation of the drilling tool and/or engagement of the drill with a workpiece. The locator brackets are sized and positioned such that engagement of the contacts occurs when the drilling tool is located in a predetermined position, thereby ensuring that drilling of a hole occurs in a desired location.

18 Claims, 10 Drawing Sheets

FAILSAFE LOCATING DEVICE FOR DRILLING HOLES

BACKGROUND

Field

The present disclosure generally relates to a drilling tool, and more specifically to a device that locates drilling holes.

Description of the Related Art

During manufacture of structures, it is may be necessary to drill holes to accommodate fasteners to join multiple parts. In some instances, an operator may not be able to clearly see where the drill hole is being placed during the drilling operation. For example, the wing structures of certain types of relatively large commercial aircraft have a number of components that are connected together to form the finished wing. Such components include, for example, two skins, stringers, ribs, bulkheads, and seal pans. The bulkheads and seal pans are positioned generally perpendicular to the span of the wing and serve to seal off sections of the wing. The bulkheads extend between opposite sets of stringers, and the seal pans seal the openings formed between the stringers on each outboard side of the bulkheads.

During the construction of a wing, the stringers and seal pans are riveted to the corresponding skin panel, the ribs are riveted to the stringers, and the bulkheads are riveted to the ribs. The rivets maintain all of the parts in relationship to each other during assembly, but further fasteners are required to ensure the structural integrity of the wing during flight. For example, a fastener is required at each point where there is a stack-up of a seal pan flange, stringer flange, and rib flange. However, areas requiring fasteners are often located in inconvenient places which may be difficult to access and/or clearly see. Therefore, placement of fasteners often occurs blindly without an operator having a clear visual of the location to be fastened.

Contemporary drilling devices for placement of fasteners utilize two hard index features to locate the drilling motor in the correct position for drilling. In operation, an operator pushes the hard index features against components of the aircraft to ensure proper placement before drilling. However, the operator cannot on occasion see to verify that the indexing features are in contact with the airplane components, resulting in drilling of holes in undesired locations, resulting in extensive rework to correct the issue.

Therefore, there is a need for an apparatus that facilitates consistent placement of holes for fasteners during manufacture of structures.

SUMMARY

The present disclosure generally relates to a drilling tool having one or more locating brackets for determining a drilled hole location. The locating brackets include contacts that, when engaged by a workpiece or a component adjacent to a workpiece, complete a pneumatic circuit of a pneumatic switch positioned within the one or more locating brackets. Completion of the pneumatic circuit permits operation of the drill or engagement of the drill with a workpiece, thus allowing engagement of the drill with a workpiece. The locator brackets are sized and positioned such that engagement of the contacts occurs when the drilling tool is located in a predetermined position, thereby ensuring that drilling of a hole occurs in a desired location.

In one embodiment, an apparatus comprises a base, and one or more locator brackets coupled to the base. Each of the one or more locator brackets includes a housing, a pneumatic switch disposed in the housing, and a trigger coupled to the pneumatic switch. The trigger has a contact at one end thereof opposite the pneumatic switch, wherein engagement of the contact by a workpiece allows air to flow through the pneumatic switch.

In another embodiment, an apparatus comprises a base, a first locator bracket coupled to the base, and a second locator bracket coupled to the base. Each of the first locator bracket and the second locator bracket including: a pneumatic switch therein, and a trigger coupled to the pneumatic switch. The trigger having a contact disposed at one end thereof, wherein pneumatic switch of the first locator bracket is connected in series to the pneumatic switch of the second locator bracket, and wherein engagement of contacts of the first locator bracket and the second locator bracket allows air to flow through the pneumatic switches of the first locator bracket and the second locator bracket.

In another embodiment, a method for locating drill holes in a structure comprises positioning a drilling tool adjacent a workpiece, the drilling tool including: a base, a drill coupled to the base, and one or more locator brackets coupled to the base. Each of the one or more locator brackets includes pneumatic switch therein, and a trigger coupled to the pneumatic switch, the trigger having a contact at one end thereof opposite the pneumatic switch, wherein engagement of the contact allows air to flow through the pneumatic switch. The method also includes engaging each contact of the one or more locator brackets, wherein engagement of each contact permits compressed air to flow from a pneumatic source through each pneumatic switch and to the drill, and while maintaining engagement of each contact of the one or more locator brackets, drilling a hole in a workpiece with the drill.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, and the disclosure may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

The present disclosure generally relates to a drilling tool for repeatably positioning the drilling tool in a fastening operation. In one aspect, a drilling tool has one or more locating brackets. The locating brackets include contacts that when engaged by a workpiece or a component adjacent to a workpiece, complete a pneumatic circuit of a pneumatic switch positioned within the one or more locating brackets. Completion of the pneumatic circuits facilitates operation of a drill of the drilling tool, thus allowing operation of the drilling tool and/or engagement of the drill with a workpiece. The locator brackets are sized and positioned such that engagement of the contacts occurs when the drilling tool is located in a predetermined position, thereby ensuring that drilling of a hole occurs in a desired location.

Figure 1:
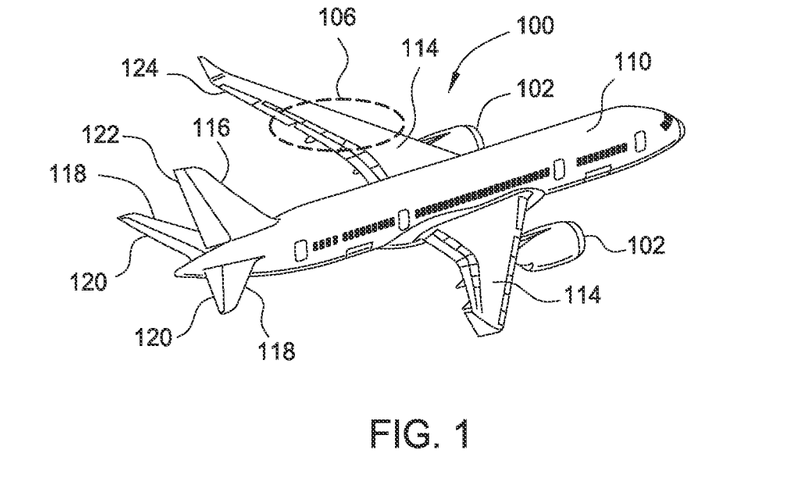
FIG. 1 is a schematic perspective view of an aircraft, according to one aspect of the disclosure.
Figure 2A:
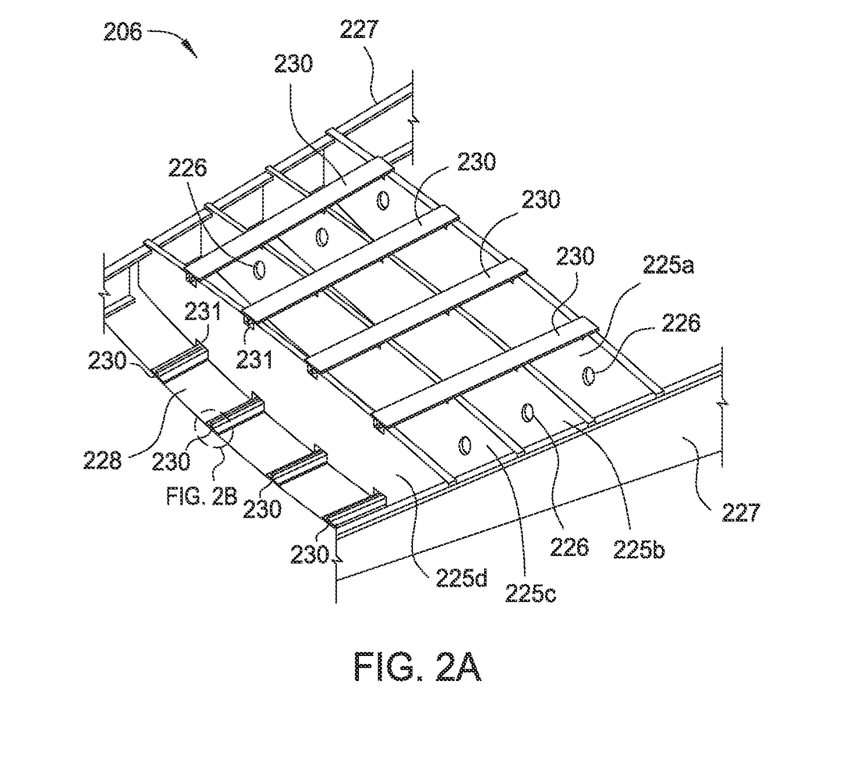
FIG. 2A is a schematic perspective view of an internal section of a wing, according to one aspect of the disclosure.

FIG. 1 is a perspective view of an aircraft 100 according to one aspect of the disclosure. The aircraft 100 includes a fuselage 110 for holding passengers and/or cargo. Two wings 114, which provide the lift needed to fly the aircraft 100, are coupled to opposite sides of the fuselage 110. A vertical stabilizer 116 and two horizontal stabilizers 118 are coupled to the fuselage 110 at a trailing end thereof. Two or more engines 102 (two are shown), which provide the thrust needed to propel the aircraft 100 forward, are coupled to the wings 114. Section 106 of a wing 114 may include a stringer, a fuel dam, and a rib (shown in FIG. 2) therein and may be a fuel-containing environment.

The aircraft 100 also includes primary flight controls to facilitate directional changes of the aircraft 100 during flight. The primary flight control surfaces on the aircraft 100 include ailerons 124, elevators 120, and a rudder 122. The ailerons 124 are located on the trailing edges of the wings 114 and control the roll of the aircraft 100. The elevators 120 are located on the horizontal stabilizer 118 of the aircraft 100 and control the pitch of the aircraft 100. The rudder 122 is located on the vertical stabilizer 116 and controls the yaw of the aircraft 100. In some aircrafts, there may be cables or wires (not shown) connecting pilot controls to actuators used to move the primary control surfaces.

FIG. 2A is a perspective view of a detailed section 206 of the wing 114 shown in FIG. 1, according to one aspect of the disclosure. The section 206 of wing 114 includes a plurality of ribs 225a-225d (four are shown) running generally parallel with the fuselage and adapted to provide structural rigidity to the wing 114. The ribs 225a-225c typically include openings 226 therein to reduce the weight of the ribs 225a-225c and facilitate fluid communication through the ribs 225a-225c within a fuel containing area, such as a fuel tank. In one embodiment, the rib 225d may be a center rib that divides a first fuel tank from a second fuel tank. In such an embodiment, rib 225d does not include openings 226, thereby establishing a fuel flow boundary for two fuel tanks. In another embodiment, the rib 225d may define an outer boundary of a fuel tank, such as a bulkhead.

Each rib 225a-225d is coupled between opposing spars 227. The spars 227 are located along the length of a wing and carry flight loads as well as the weight of the wing when grounded. Upper and lower skins 228 may be positioned in contact with the ribs 225a-225d on a lower surface of the ribs 225a-225d and an upper surface of the ribs 225a-225d to facilitate interconnection therebetween, thereby increasing the structural rigidity of the wing 114. The upper skin 228 has been omitted from FIG. 2A for clarity.

Stringers 230 are disposed on the internal surface of the skins 228 and are sized and positioned to fit within openings 231 formed in the upper and lower surfaces of the ribs 225a-225d to accommodate the stringers 230 therein during assembly. In one example, the openings 231 may be rectangular openings adapted to accept a stringer 230 therein. However, other opening shapes are contemplated. The interlocking shapes of the ribs 225a-225d and the stringers 230 further increase structure rigidity of the wing 114. It is to be understood that the stringers 230 may have a length that spans more than four ribs.

Figure 2B:
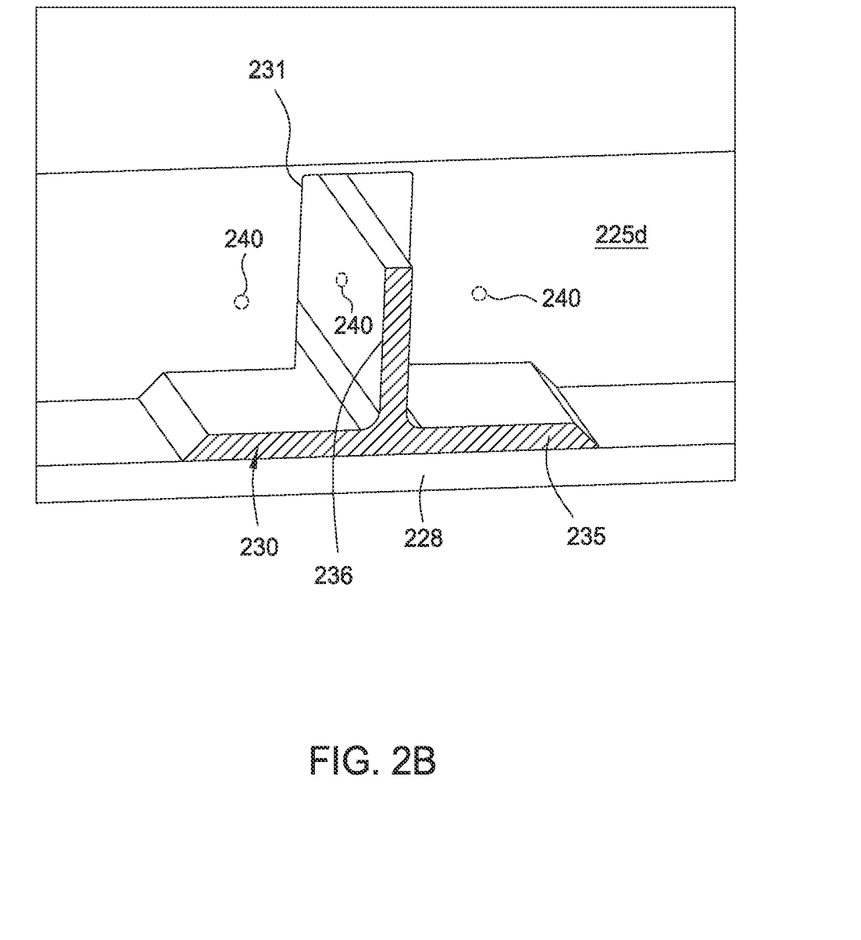
FIG. 2B is a schematic perspective view of a detailed section of FIG. 2A.

FIG. 2B is a perspective view of a detailed section of FIG. 2A. FIG. 2B illustrates the stringer 230 positioned within an opening 231 of the rib 225d. The stringer 230 includes a base flange 235 disposed on and in contact with an internal surface of the skin 228. The stringer 230 also includes a vertical flange 236 extending perpendicularly from the base flange 235 into the opening 231. During assembly of the wing 114, the stringer 230 is positioned within the opening 231, and fuel dam or bracket is disposed around the vertical flange 236 over the opening 231 to seal the opening 231. The fuel dam or bracket may then be secured to one or more of the rib 225d, the stringer 230, and the skin 228. To secure the fuel dam or bracket, one or more holes 240 may be formed in the rib 225d and/or the stringer 230 to accommodate fasteners therein.

The holes 240 generally are not formed until the wing 114 is partially constructed in order to ensure proper alignment of the components. However, in the partially-constructed state, it may be difficult for an operator to access or to see the areas in which holes 240 will be formed. Thus, an operator may have to work blindly in these areas without visual confirmation of the accuracy of the placement of holes 240. Contemporary drilling methods have no way of ensuring the drill is properly positioned before drilling holes 240, and thus, often result in improper placement of holes 240, thereby requiring extensive rework.

Figure 3A:
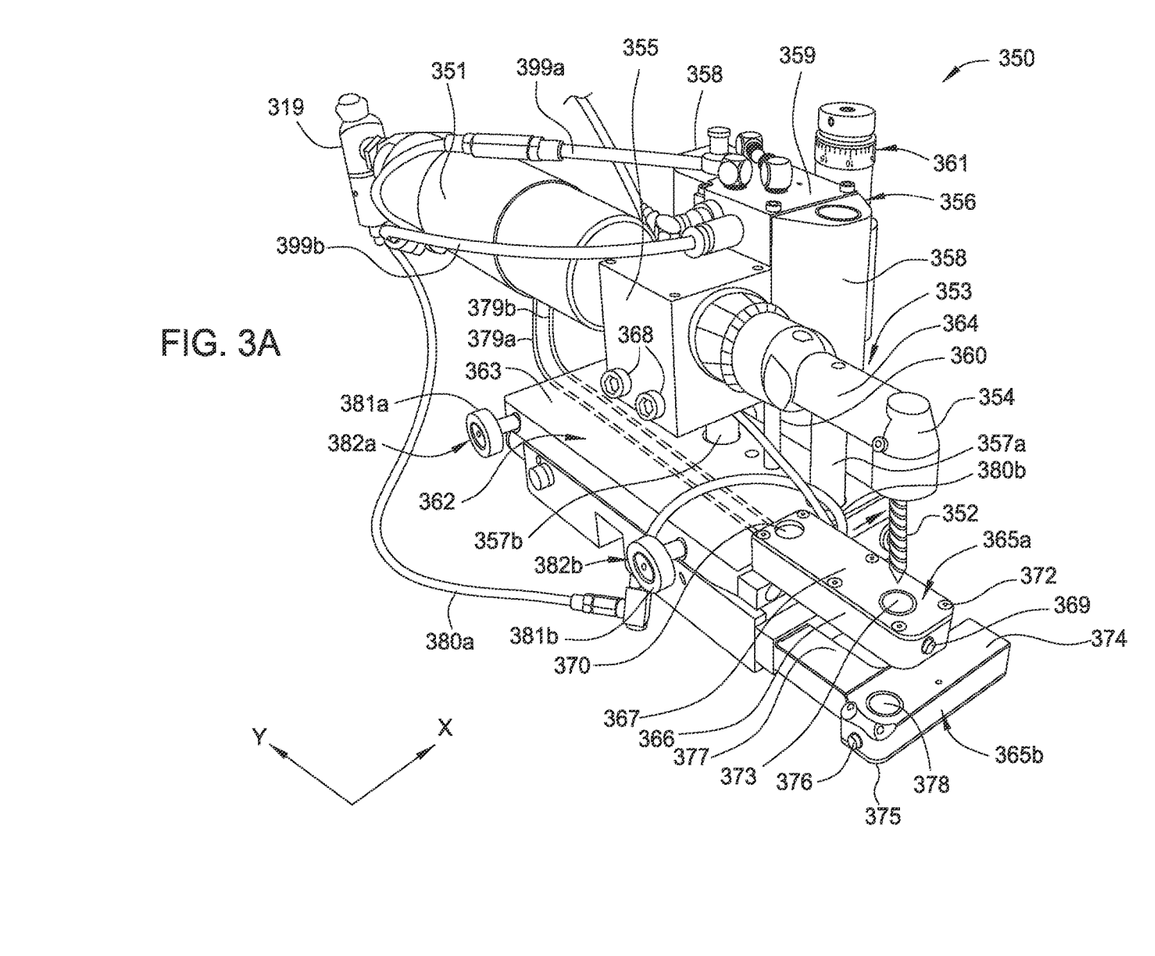
FIG. 3A is a schematic perspective view of a drilling tool, according to one aspect of the disclosure.

FIG. 3A is a schematic perspective view of a drilling tool 350, according to one aspect of the disclosure. The drilling tool 350 includes a base 362, a vertical support 356 extending orthogonally from the base 362, and drill 353. The drilling tool 350 may be a pneumatic drill tool. The drilling tool 350 includes a drill 353 having a pneumatic source 351 for rotationally driving a drill bit 352 secured in a chuck 354 of the drill 353. A drill shaft 364 of the drill 353 is coupled to the chuck 354 at a first end thereof and to a pneumatic actuator 355, such as a motor, at a second end thereof. The pneumatic actuator 355 receives compressed air from the pneumatic source 351 and converts the received compressed air into mechanical energy by expansion of the compressed air, thereby rotating the drill bit 352 via the drill shaft 364. The pneumatic source 351 may include a multi-connection valve 319 at one end therefore to facilitate distribution of compressed air from the pneumatic source 351.

The pneumatic actuator 355 is coupled to the vertical support 356 via fasteners 368 to facilitate vertical actuation of the pneumatic actuator 355 and components coupled thereto. The vertical support 356 includes one or more guide rails 357a, 357b (two are shown) upon which corresponding guides 358 travel to facilitate vertical movement of the pneumatic source 351, the pneumatic actuator 355, and the drill 353. The guides 358 are coupled to a pneumatic actuator 359, such as a motor, which drives a pneumatic cylinder 360 parallel to the guide rails 357a, 357b to facilitate vertical actuation of the guides 358 and components coupled thereto, such as the pneumatic actuator 359.

The pneumatic cylinder 360 extends from a lower surface of the pneumatic actuator 359 and may be secured to the base 362. As the pneumatic cylinder 360 is driven from the pneumatic actuator 359, the pneumatic actuator 359 is actuated vertically. Conversely, the pneumatic cylinder 360 may be driven in the opposite direction to facilitate lowering of the pneumatic actuator 359 and components coupled thereto. An adjustment knob 361 facilitates setting of the rate of downward travel of the drill 353 during operation. Compressed air is provided from the pneumatic source 351 to the pneumatic actuator 359 via one or more hose assemblies 399a, 399b.

The guide rails 357a, 357b are secured to the base 362 and extend orthogonally from an upper surface 363 of the base 362. A first locator bracket 365a and a second locator bracket 365b are positioned proximate to one another and extend from the base 362 adjacent the drill 353. The first locator bracket 365a includes a housing 366, a lid 367 disposed on the housing 366, and a contact 369 extending through an opening formed in the housing 366. The lid 367 is secured to the housing 366 via one or more fasteners 372 (six are shown). The lid 367 includes an opening 370 at a first end thereof for accepting a fastener therein to facilitate coupling of the first locator bracket 365a to the base 362. An opening (not shown) is positioned coaxially with the opening 370 and formed through a floor of the housing 366 for accepting the fastener 371 to facilitate coupling of the first locator bracket 365a to the base 362.

The lid 367 also includes an opening 373 formed through a second end of the lid 367. The opening 373 is sized to accept the drill bit 352 therein to facilitate drilling of a workpiece. A corresponding coaxial opening 474 (shown in FIG. 4) is formed through the housing 366 to allow passage of the drill bit 352 through the first locator bracket 365a. In one example, the openings 373 and 474 are located at the same end of the housing 366 as the contact 369. The first locator bracket 365a is coupled to the pneumatic source 351 by hosing assemblies 379a, 379b to facilitate transfer of a fluid, such as compressed air, to and/or from the first locator bracket 365a.

A second locator bracket 365b is disposed adjacent to the first locator bracket 365a. The second locator bracket 365b includes a housing 374, a lid 375, and a contact 376 protruding from the housing 374. An arm 377 extends perpendicularly from second locator bracket 365b and couples the second locator bracket 365b to the base 362. In one example, the arm 377 is parallel to the housing 366 of the first locator bracket 365a. The housing 374 of the second locator bracket 365b also includes an opening 378 formed therein for accommodating the drill bit 352 during a drilling operation. A corresponding and coaxial opening is formed in the lid 375 and is similar to the opening 373 formed in the lid 367 of the first locator bracket 365a. The second locator bracket 365b is coupled to the pneumatic source 351 by hosing assemblies 380a, 380b to facilitate transfer of a fluid, such as compressed air, to and/or from the second locator bracket 365b.

The contact 376 of the second locator bracket 365b is positioned coplanar with the laterally-outward surfaces 381a, 381b of clamps 382a, 382b, which may be, for example, vacuum clamps. The clamps 382a, 382b extend from a side of the base 362. The clamps 382a, 382b may be fixed in position, or alternatively, may be adjustable. The clamps 382a, 382b facilitate proper orientation of the drilling tool 350 with respect to a workpiece by ensuring alignment along the y-axis. Moreover, the clamps 382a, 382b prevent movement of the drilling tool 350 during a drilling operation. In one example, the clamps 382a, 382b may be secured directly to the workpiece being drilled. A switch (not shown) may be used to selectively engage or disengage the vacuum pressure through the clamps 382a, 382b. It is contemplated that the clamps 382a, 382b may be excluded, and instead, a surface of the base 362 may be formed coplanar with the contact 376.

Figure 3B:
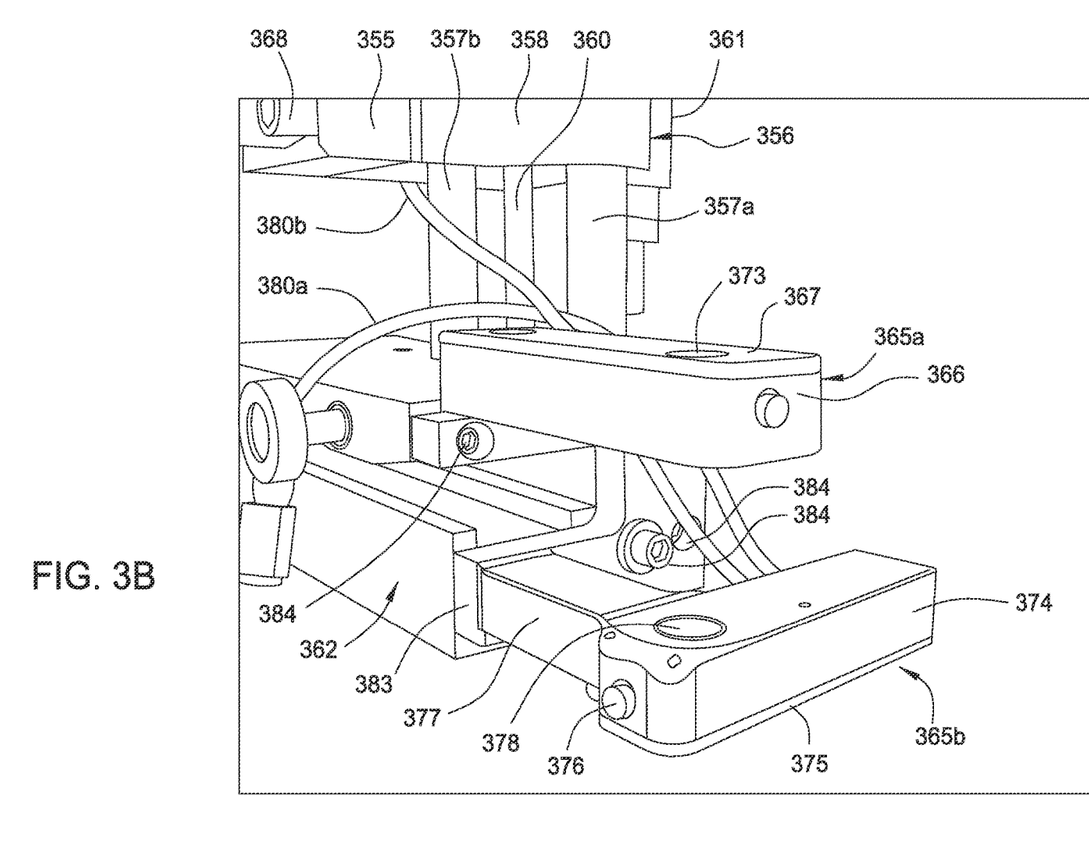
FIG. 3B is an enlarged schematic perspective view of the drilling tool of FIG. 3A, according to one aspect of the disclosure.

FIG. 3B is an enlarged schematic perspective view of the drilling tool 350 of FIG. 3A, according to one aspect of the disclosure. As illustrated in FIG. 3B, the first locator bracket 365a and the second locator bracket 365b are coupled to the base 362 through a mounting plate 383. The mounting plate 383 is a U-shaped bracket coupled to the base 362 by one or more fasteners 384 (two are shown). An alignment pin 398 may extend from the base 362 to engage the mounting plate 383 to facilitate alignment between the base 362 and the mounting plate 383. The mounting plate 383 facilitates connection of the first locator bracket 365a and the second locator bracket 365b to the base 362. Moreover, the mounting plate 383 facilitates retrofitting of the first locator bracket 365a and the second locator bracket 365b to existing drill tools, while also facilitating ease of maintenance on the first locator bracket 365a and the second locator bracket 365b, due to simplified removal and installation. It is contemplated, however, that the first locator bracket 365a and the second locator bracket 365b may be connected directly to the base 362

During operation, the drilling tool 350 is positioned to drill an opening through a workpiece using the drill bit 352. For example, one or more holes 240 shown in FIG. 2B may be formed using the drilling tool 350. The drilling tool 350 is positioned such that each of the contacts 369, 376 engage a surface of the workpiece or a component adjacent thereto. Additionally, the clamps 382a, 382b may also be positioned to engage the workpiece or a component adjacent thereto. A vacuum may be drawn through the clamps 382a, 382b to secure the clamp the drilling tool 350 in position. The relative positions of the clamps 382a, 382b and the contacts 369, 376 may be adjusted such that when the clamps 382a, 382b and the contacts 369, 376 engage a workpiece and/or component adjacent thereto, the openings 373, 378 are axially aligned to form an opening in a workpiece at a desired location.

Adjustment of the position of the contacts 369, 376 may occur by exchanging the first locator bracket 365a and the second locator bracket 365b for brackets of a predetermined size. Additionally or alternatively, the mounting plate 383 may be exchanged with another coupling that positions the contacts 369, 376 in a predetermined location.

In contrast to conventional drills, the drilling tool 350 ensures correct alignment of the drill bit 352 for forming an opening in a workpiece by preventing operation of the drill 353 unless the contacts 369, 376 have been engaged and depressed. Each of the locator brackets 365a, 365b includes a pneumatic switch 485 (shown in FIG. 4) therein coupled to one of the contacts 369, 376. The pneumatic switch 485 prevents operation of the drill 353 until the corresponding contact 369 or 376 is depressed, thereby completing the circuit of the pneumatic switch 485 and thus allowing operation of the drill 353.

In one example, each of the locator brackets 365a, 365b includes a respective pneumatic switch 485. In such an embodiment, to facilitate operation of the drill 353, each of the contacts 369 and 376 requires depression in order to complete a pneumatic circuit of the switch 485 thereby facilitating application of pneumatic power to the drill 353. Thus, the drill 353 cannot operate unless the contacts 369, 376 are depressed. The contacts 369, 376 are depressed when the drilling tool 350 is positioned in the correct location during workpiece assembly.

For example, the first locator bracket 365a and the second locator bracket 365b of the drilling tool 350 may be sized and position to contact predetermined reference surfaces, such as a workpiece or component adjacent thereto, such that the drilling tool 350 is consistently positioned with respect to the reference surface. Thus, a drilling of a hole via the drill 353 consistently occurs a predetermined distance from the reference surfaces. In one example, the first locator bracket 365a and the second locator bracket 365b may be positioned perpendicular to one another. In such an embodiment, each of the first locator bracket 365a and the second locator bracket 365b may position the drilling tool 350 a respective distance from one or more reference surfaces in the X and Y. Thus, the locator brackets consistently position the drilling tool 350 in a desired location for hole formation. It is to be understood, however, that other relative orientations, in addition to perpendicular, between the first locator bracket 365a and the second locator bracket 365b are contemplated.

As mentioned above, an operator can be assured that the first locator bracket 365a and the second locator bracket 365b of the drilling tool 350 are in contact with the one or more reference surfaces, because the drilling tool 350 will not operate unless the contacts 369, 376 of the first locator bracket 365a and the second locator bracket 365b are engaged by the reference surfaces. Therefore, even if an operator cannot see the drilling location of a workpiece, the operator can be assured that the drill 353 is forming a hole in the correct location because the drilling tool 350 only operates when the drilling tool 350 is positioned in the correct location, thereby depressing the contacts 369, 376.

Figure 4:
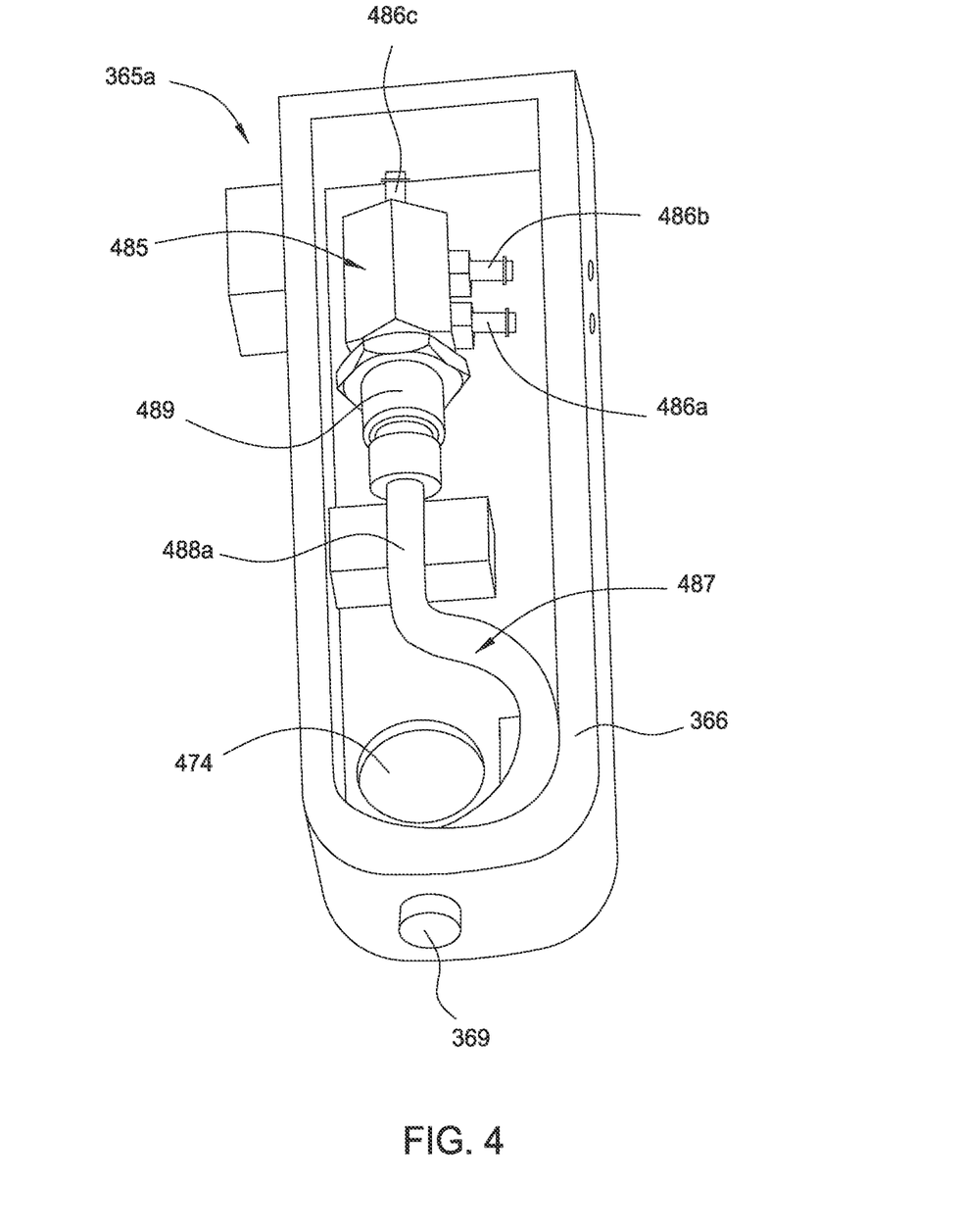
FIG. 4 is a perspective view of a locator bracket, according to one aspect of the disclosure.

FIG. 4 is a perspective view of a locator bracket 365a, according to one aspect of the disclosure. The lid 367 (shown in FIG. 3B) has been removed to expose the internal components of the housing 366. A pneumatic switch 485 is disposed within housing 366. The pneumatic switch includes connections 486a, 486b, 486c to facilitate coupling of the pneumatic switch 485 to the hosing assemblies 380a, 380b. In example, connection 486c may be an extra inlet or outlet port which is not utilized. Openings 492 are formed in the housing 366 to facilitate coupling of the hosing assemblies 380a, 380b to the connections 486a, 486b, and/or 486c. The pneumatic switch 485 includes a trigger 487 extending therefrom. The trigger 487 protrudes from the housing 366 to expose the contact 369 for engagement with a workpiece. In one embodiment, the contact 369 is formed integrally with the trigger 487 and disposed at one end thereof. In another embodiment, the contact 369 may be a separate component from the trigger 487. In such an embodiment, engagement of the contact 369 by a workpiece or other reference structure may facilitate actuation of the trigger 487.

The trigger 487 includes a first linear section 488a coupled to a base 489 of the pneumatic switch. An arced section 488b is coupled to the first linear section 488a opposite the base 489. The contact 369 is a second linear section coupled to the arced section 488b opposite the first linear section 488a. In one example, the contact 369 is coaxially located with respect to the first linear section 488a. The first linear section 488a is supported by a support block 490 coupled to an internal surface of the housing 366 and positioned adjacent to the linear section 488a.

The arced section 488b is positioned about the opening 474 formed through the housing 366 to partially circumscribe the opening 474. The arced section 488b is sized to accommodate a drill bit 352 as the drill bit 352 is disposed through the opening 474 during a drilling operation. Thus, the contact 369 can be disposed on a side of the opening 474 opposite of the pneumatic switch 485, thus increasing the flexibility in configurations of the first locator bracket 365a. Moreover, the shape of the trigger 487 allows the drill bit 352 to pass through the first locator bracket 365a, thus minimizing the size of the drilling tool 350 and thereby allowing the drilling tool to be positioned in smaller places during drilling operations.

The locator bracket 365b (shown in FIG. 3A) is similar to the locator bracket 365a. However, as discussed above, the locator bracket 365b additionally includes an arm 377 extending from the housing 374 of the second locator bracket 365b. During operation, engagement of the contact 369 with a workpiece moves the trigger 487 axially, resulting in actuation of the trigger 487 within the base 489, thereby completing the pneumatic circuit within the pneumatic switch 485. Completion of the pneumatic circuit of both of the pneumatic switches 485 within the locator brackets 365a, 365b allows operation of the drill 353 to form an opening through a workpiece in a desired location. In one example, the pneumatic switches 485 may be connected in series. If any of the contacts 369, 376 are not engaged, then the circuit of the corresponding pneumatic switch 485 is not complete, and drill 353 is inoperable, thus preventing formation of an opening in an undesired location.

Figure 5A:
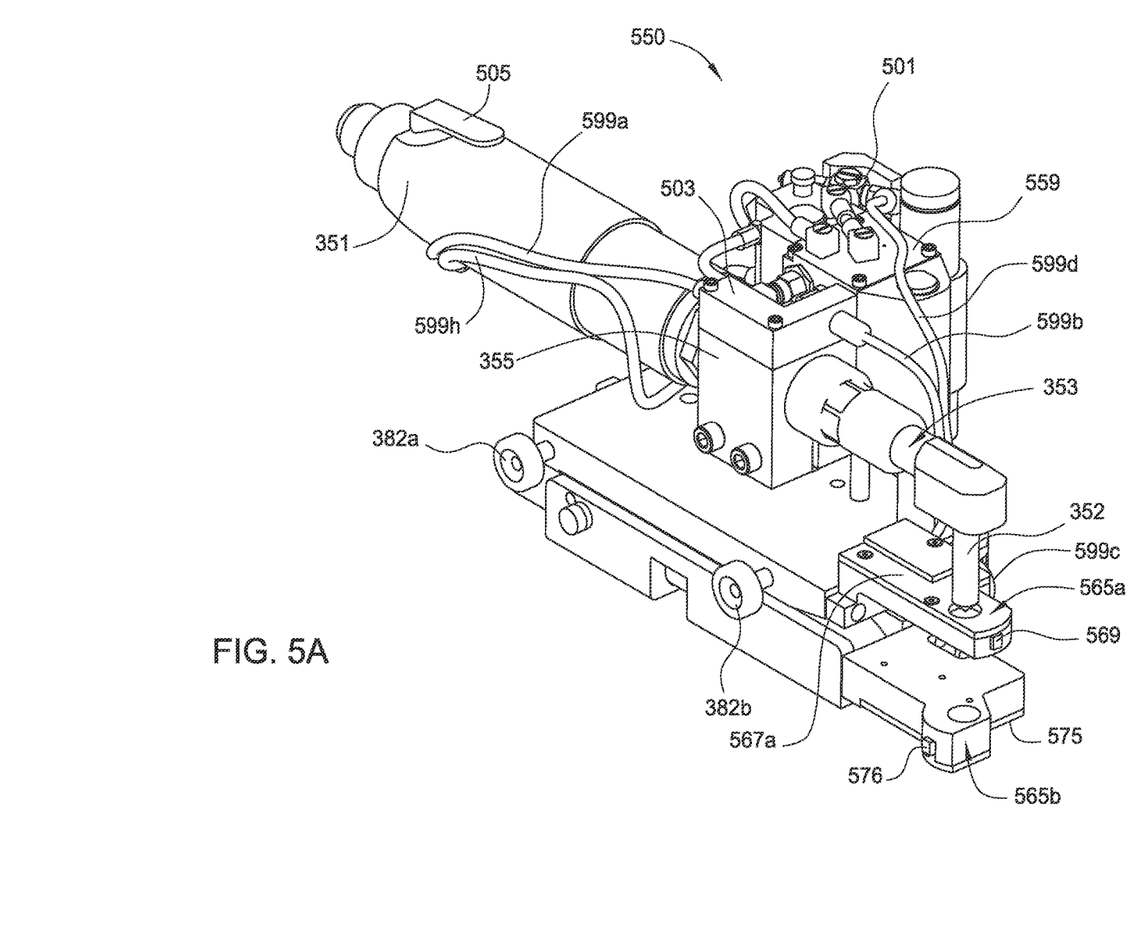
FIGS. 5A and 5B are schematic perspective views of a drilling tool, according to another aspect of the disclosure.
Figure 5B:
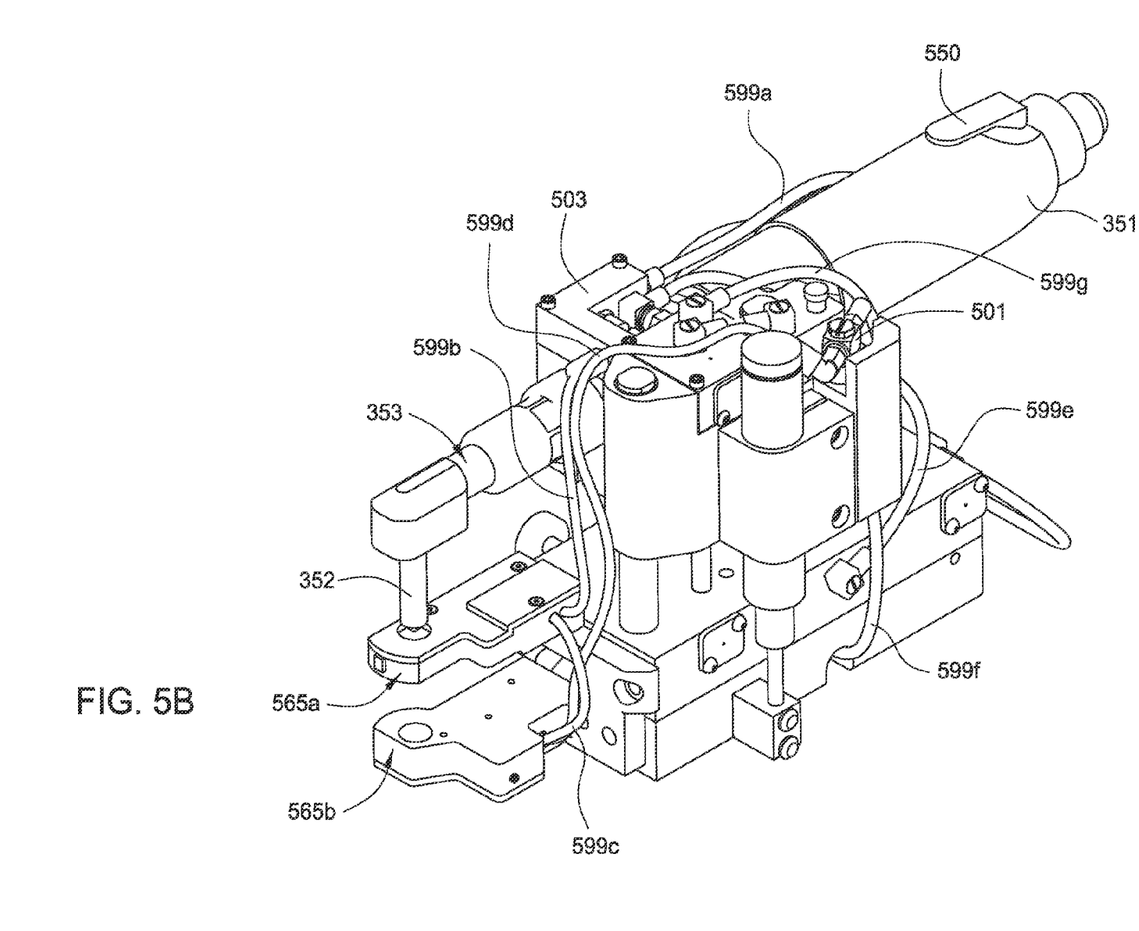
Figure 5C:
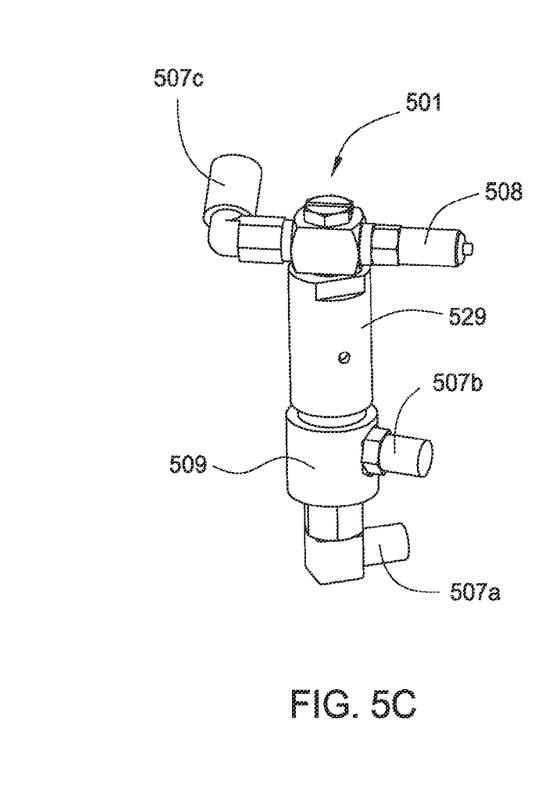
FIG. 5C is a schematic perspective view of a pilot valve, according to one aspect of the disclosure.

FIGS. 5A and 5B are schematic perspective views of a drilling tool 550, according to another aspect of the disclosure. FIG. 5C is a schematic perspective view of a pilot valve 501, according to one aspect of the disclosure. The drilling tool 550 is similar to the drilling tool 350. However, the drilling tool 550 utilizes a pilot valve 501 to regulate airflow within the drilling tool 550. Additionally, the drilling tool 550 utilizes locator brackets 565a, 565b, rather than locator brackets 365a, 365b.

The pilot valve 501 is a multi-connection valve which prevents vertical actuation of the drill 353 unless contacts 569 and 576 of the locator brackets 565a, 565b are engaged. However, the pilot valve 501 may allow rotational actuation of the drill bit 352 even when the contacts 569 and 576 are not engaged. Thus, an operator can test for pneumatic air supply by rotating the drill bit 352 without unintentionally drilling a workpiece, since the drill bit 352 cannot vertical actuate into a drilling positioning without engagement of contacts 569, 576. Additionally, the operator can apply a drilling lubricant to the drill bit 352 while the drill bit 352 is rotating. The pilot valve 501 may be coupled to the pneumatic actuator 359. However, other locations for placement of the pilot valve 501 are also contemplated.

Operation of the drilling tool 550 is facilitated by compressed air received from a pneumatic source 351. A first hose 599a provides a constant supply from the pneumatic source 351 to a manifold 503 coupled to an upper end of the pneumatic actuator 355. The constant air supply from the first hose 599a is utilized to facilitate operation of the clamps 382a, 382b, as well as the locator brackets 565a, 565b. The compressed air from the first hose 599a is provided to the first locator bracket 565a through a hose 599b extending from the manifold 503. Compressed air is provided through a pneumatic switch 585a (shown in FIG. 5D) positioned within the first locator bracket 565a upon engagement of the contact 560, and to the pneumatic switch 585b of the second locator bracket 565b via a hose 599c. Upon engagement of bot the contact 569 and 576, compressed air flows through the pneumatic switch 585b of the second locator bracket 565b to the pilot valve 501 via a hose 599d. Thus, the pneumatic switches of the first locator bracket 565a and the second locator bracket 565b are connected in series.

Operation of the clamps 382a, 382b is facilitated by air supplied through a hose 599e which engages pistons (not shown) of the clamps 382a, 382b. In one example, two single acting spring return air cylinders control the clamps 382a, 382b, and a double acting cylinder pushes a ramp into position to facilitate clamping against the clamps 3582a, 382b. Air supplied through a hose 599f disengages the clamps 382a, 382b. A switch 617 (shown in FIG. 6) may be used to toggle the air flow between the hoses 569e, 569f. A hose 599g provides compressed air from the pilot valve 501 to the pneumatic actuator 359 to facilitate vertical actuation of the drill 353. A hose 599g provides compressed air to the pilot valve 501 for facilitating rotational actuation of the drill bit 352. Compressed air is provided through the hose 599h upon engagement of a switch 505, such as a trigger, by an operator.

FIG. 5C illustrates a schematic view of the pilot valve 501, according to one aspect. The pilot valve 501 includes connections 507a-507c, an indicator 508, a body 529, and a switch valve 509. A third connection 507c is disposed at an upper end of the pilot valve 501 for receiving air from hose 599d, e.g., air that has passed through the first locator bracket 565a and the second locator bracket 565b. Air received through the third connection 507c actuates a pilot actuator (not shown) located within the body 529. Actuation of the pilot actuator allows air flow received from a first connection 507a to travel through the pilot valve 501 and exit and a second connection 507b. As long as air is received through the third connection 507c, e.g., the contacts of the locator brackets are engaged, the pilot actuator allows airflow from the first connection 507a to the second connection 507b. The first connection 507a is disposed at a lower end of the pilot valve 501 and receives air from hose 599h upon engagement of the switch 505. Thus, when the drilling tool 530 is properly indexed, e.g., the contacts 569 and 576 are engaged, and the trigger 505 is engaged by an operator, pneumatic air is provided to the drill 353 to vertically actuate the drill 353 and to rotate the drill bit 352 to allow drilling.

Additionally, as air is received through the third connection 507c, the indicator 508 disposed at the upper end of the pilot valve 501, is deployed. The indicator 508 may be an inwardly-biased post that is actuated outward upon application of pressure from incoming air through the third connection 507c. Outward actuation of the indicator 508 provides visual confirmation that air is flowing through the connection 507c, e.g., that the circuit of the pneumatic switches 585a, 585b is complete. Thus, even if an operator has a difficult time visualizing a drilling location, the operator can visually confirm that the drilling tool is positioned in the correct location due to deployment of the indicator 508.

Figure 5D:
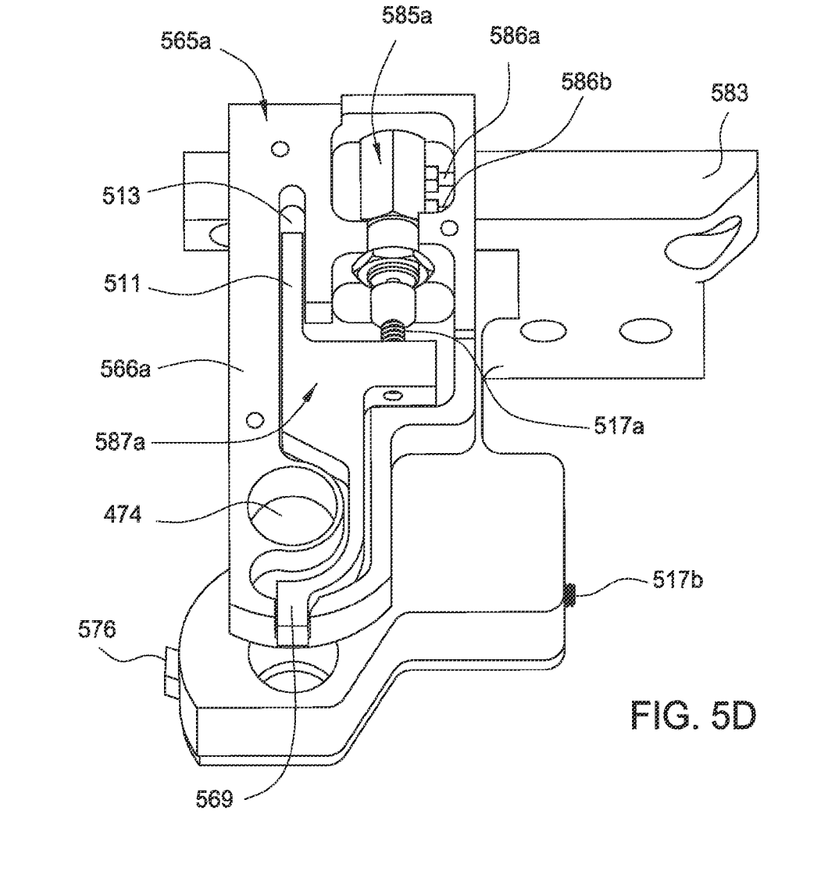
FIGS. 5D and 5E are schematic perspective views of locator brackets, according to another aspect of the disclosure.
Figure 5E:
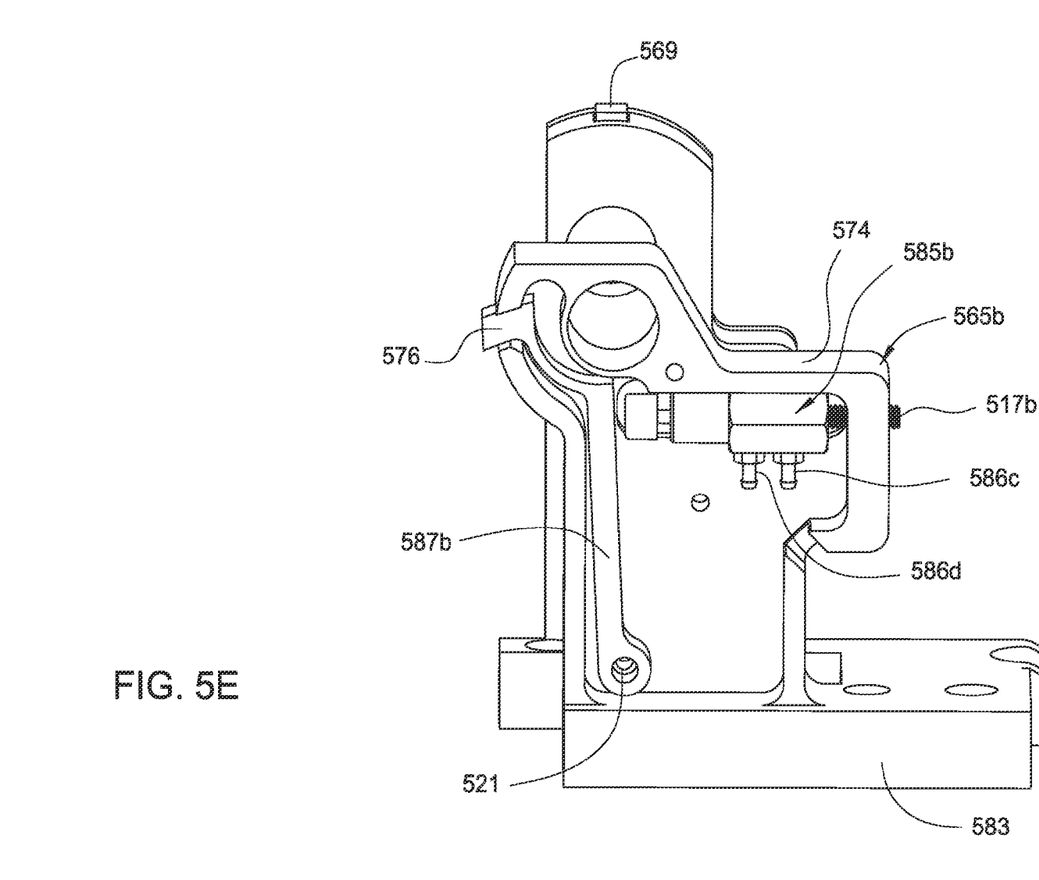

FIGS. 5D and 5E are schematic perspective views of locator brackets 565a, 565b, according to another aspect of the disclosure. FIG. 5D is a top perspective view of the locator brackets 565a, 565b, and FIG. 5B is a bottom perspective view of the locator brackets 565a, 565b. The locator brackets 565a, 565b are similar to the locator brackets 365a, 365b discussed above. In the embodiment shown in FIGS. 5A-5E, the locator brackets 565a, 565b are integrally formed with a mounting plate 583. The locator bracket 565a includes a housing 566a and lid 567a (shown in FIG. 5A). A pneumatic switch 585a is disposed within the housing 566a. The pneumatic switch includes two connections 586a, 586b for receiving and delivering air therethrough. In one example, the hose 599b (shown in FIG. 5A) may be coupled to the connection 586a, and the hose 599c may be coupled to the connection 586b.

Actuation of the trigger 587a via engagement of the contact 569 disposed at a distal thereof by a workpiece allows air received from the connection 586a to be delivered through the connection 586b. Engagement of the contact 569 results in movement of the trigger 587a in direction axially aligned with the pneumatic switch 585a. The pneumatic switch 585a may include a set screw 517a disposed in contact with the trigger 587a for adjusting the position of the trigger 587a with respect to the pneumatic switch 585a. In one embodiment, the trigger 587a includes an elongated member 511 disposed in a recess 513 of the housing 566a to maintain alignment of the trigger 587a during actuation. The trigger 587a is similar to the trigger 487 in that it is non-linear to partially circumscribe an opening 474 to accommodate the drill bit 352, thereby reducing the size of the first locator bracket 565a.

The locator bracket 565b is similar to the locator bracket 365b, but includes a pivotable trigger 587b. The locator bracket 565b includes a housing 574 upon which a lid 575 (shown in FIG. 5A) is disposed. The pivotable trigger 587b is disposed in a cavity of the housing 574. A first end of the trigger 587b is pinned to an internal surface of the housing 574 by a pin 513. The trigger 587b is allowed to pivot about the pin 513. As a contact 576 of the trigger 587b is engaged by a workpiece, the trigger 587b pivots into contact with the pneumatic switch 585b, thereby completing the circuit of the pneumatic switch. Completion of the pneumatic switch 585b allows air received from hose 599c at connection 586c to travel through the pneumatic switch 585b and exit the connection 586d into the hose 599d.

The trigger 587b is similar to the trigger 487 in that it is non-linear to partially circumscribe an opening formed in the housing 574, thereby reducing the size of the first locator bracket 565a. Utilization of the pivotable trigger 587b may result in a reduction of occupied space within the housing 574, in contrast to a linearly actuatable trigger, such as trigger 587a, thus reducing the overall size requirement of the housing 574. Adjustment of the relative position between the pivotable trigger 587b and the pneumatic switch 585b may be accomplished through a set screw 517b.

Figure 6:
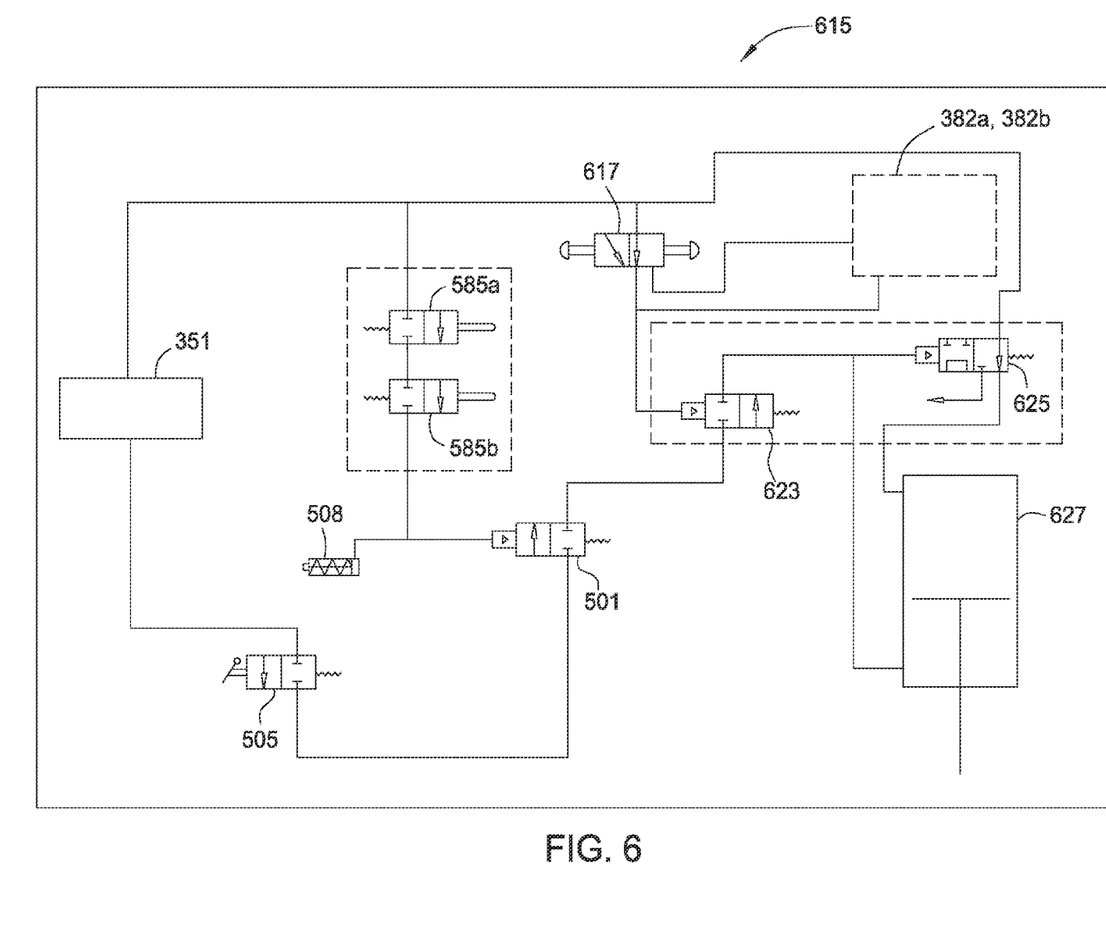
FIG. 6 is schematically illustrates a pneumatic circuit diagram of the drilling tool shown in FIGS. 5A-5E, according to one aspect of the disclosure.

FIG. 6 is schematically illustrates a pneumatic circuit diagram 615 of the drilling tool 550 shown in FIGS. 5A-5E, according to one aspect of the disclosure. The circuit diagram 615 illustrates the pneumatic connections between the pneumatic source 351, the pneumatic switches 585a, 585b, the indicator 508, the clamps 382a, 382b, and the pilot valve 501. The circuit diagram 615 also illustrates the pneumatic connections to a switch 617 for toggling airflow between hoses 599e and 599f to facilitate operation of the clamps 382a, 382b. Additionally, the circuit diagram 615 illustrates connections to pneumatic switches 623, 623 located within or coupled to the pneumatic actuator 359. The pneumatic switch 623 prevents vertical actuation of the drill 353 for engagement of a workpiece by the drill 353 unless the clamps 382a, 382b are engaged. The pneumatic switch 625 allows the drill 353 to automatically return to a rest position after being actuated vertically as well as allowing for an exhaust port in the case of a pneumatic piston. Although FIG. 6 illustrates one example of a pneumatic circuit, it is contemplated that other pneumatic circuit designs may also be employed.

Benefits of the disclosed embodiments include increased accuracy of hole placement during drilling operations, particularly in locations which are visually obscured to an operator. The drilling devices disclosed herein include failsafe features which prevent drill operation unless the failsafe features are appropriately engaged. The failsafe features may include two locator brackets which may be sized, spaced, and oriented to engage a workpiece or components adjacent thereto, such that the contacts of the locator brackets are depressed when the drilling tool is in a predetermined location. One the contacts are depressed—indicating that the locating brackets, and thus the drilling tool, are in the correct location—only then may a drilling operation commence. Thus, even if an operator is unable to see a drilling location, an operator can be assured that drilling is occurring in the correct location because the drill tool will only operate when located in the proper position. The drilling tool can easily be used in multiple locations by exchanging the locator brackets for other locator brackets of a predetermined size, shape, or orientation.

While the foregoing is directed to embodiments of the present disclosure, other and further embodiments of the disclosure may be devised without departing from the basic scope thereof, and the scope thereof is determined by the claims that follow.

What is claimed is:

1. An apparatus, comprising:
a base; and
one or more locator brackets coupled to the base, each of the one or more locator brackets including:
a housing having openings formed therethrough for accommodating a drill bit;
a pneumatic switch disposed in the housing; and
a trigger coupled to the pneumatic switch, the trigger including an arced portion that partially circumscribes the opening formed through the housing to accommodate the drill bit, the trigger having a contact at one end thereof opposite the pneumatic switch, wherein engagement of the contact by a workpiece allows air to flow through the pneumatic switch.

2. The apparatus of claim 1, further comprising a drill which drives the drill bit, wherein engagement of the contacts of the one or more locator brackets provides air to the drill to facilitate operation of the drill.

3. The apparatus of claim 1, further comprising:
a pneumatic source; and
a first pneumatic actuator coupled to the pneumatic source, the first pneumatic actuator facilitating rotation of the drill bit.

4. The apparatus of claim 1, wherein the contact of each locator bracket extends through an opening formed in each respective housing.

5. The apparatus of claim 1, wherein the one or more locator brackets comprises two locator brackets.

6. The apparatus of claim 5, wherein the opening formed in a first locator bracket for accommodating the drill bit is axially aligned with the opening formed in a second locator bracket for accommodating the drill bit.

7. The apparatus of claim 5, wherein the pneumatic switch of each locator bracket is connected in series.

8. The apparatus of claim 1, further comprising a multi-connection pilot valve coupled to the pneumatic switches and an actuator for operating the drill bit.

9. An apparatus, comprising:
a base;
a first locator bracket coupled to the base, the first locator bracket including:
a pneumatic switch therein; and
a trigger comprising an arced section and a linear section, the trigger coupled to the pneumatic switch and having a contact disposed at one end thereof; and
a second locator bracket coupled to the base, the second locator bracket including:
a pneumatic switch therein; and
a trigger coupled to the pneumatic switch, the trigger having a contact disposed at one end thereof, wherein the pneumatic switch of the first locator bracket is connected in series to the pneumatic switch of the second locator bracket, and wherein engagement of the contact of the first locator bracket and the contact of the second locator bracket allows air to flow through the pneumatic switch of the first locator bracket and the pneumatic switch of the second locator bracket.

10. The apparatus of claim 9, wherein the trigger of the second locator bracket has an arced section and a liner section.

11. The apparatus of claim 10, wherein the first locator bracket includes an opening therein for accommodating a drill bit, the opening partially circumscribed by the arced section of the trigger of the first locator bracket.

12. The apparatus of claim 11, wherein the second locator bracket includes an opening therein for accommodating a drill bit, the opening partially circumscribed by the arced section of the trigger of the second locator bracket.

13. The apparatus of claim 12, wherein the opening formed in the first locator bracket is axially aligned with the opening formed in the second locator bracket.

14. The apparatus of claim 10, wherein the trigger of the second locator bracket is pivotable about a point.

15. The apparatus of claim 9, wherein each of the first locator bracket and the second locator bracket include a housing having a lid disposed thereon.

16. The apparatus of claim 15, wherein the second locator bracket includes an arm coupled to the housing of the first locator bracket, the arm adapted to couple the second locator bracket to the base.

17. A method for locating drill holes in a structure, comprising:
positioning a drilling tool adjacent a workpiece, the drilling tool including:
a base;
a drill coupled to the base; and
one or more locator brackets coupled to the base, each of the one or more locator brackets including:
a pneumatic switch therein; and
a trigger coupled to the pneumatic switch, the trigger having an arced section and a linear section, the trigger having a contact at one end thereof opposite the pneumatic switch, wherein engagement of the contact allows air to flow through the pneumatic switch;
engaging each contact of the one or more locator brackets, wherein engagement of each contact permits compressed air to flow from a pneumatic source through each pneumatic switch and to the drill; and
while maintaining engagement of each contact of the one or more locator brackets, drilling a hole in a workpiece with the drill.

18. The method of claim 17, wherein engagement of each contact of the one or more locator brackets allows rotation of a drill bit of the drill.

* * * * *